United States Patent [19]

De Luca et al.

[11] 3,880,894

[45] Apr. 29, 1975

[54] 1,25-DIHYDROXYERGOCALCIFEROL

[75] Inventors: Hector F. De Luca; Glenville Jones, both of Madison; Heinrich K. Schnoes, Waunakee, all of Wis.

[73] Assignee: Wisconsin Alumni Research Foundation, Madison, Wis.

[22] Filed: May 24, 1974

[21] Appl. No.: 472,953

[52] U.S. Cl. ............................................. 260/397.2
[51] Int. Cl. ........................................ C07C 171/08
[58] Field of Search .................................. 260/397.2

[56] References Cited

UNITED STATES PATENTS

| | | | |
|---|---|---|---|
| 3,697,559 | 10/1972 | De Luca et al. | 260/397.2 |
| 3,786,092 | 1/1974 | Schroeder et al. | 260/397.2 |

*Primary Examiner*—Elbert L. Roberts
*Attorney, Agent, or Firm*—Howard W. Bremer

[57] ABSTRACT

1,25-Dihydroxyergocalciferol. The compound is characterized by antirachitic activity substantially greater than that exhibited by vitamin $D_3$.

1 Claim, No Drawings

1,25-DIHYDROXYERGOCALCIFEROL

The invention described herein was made in the course of work under a grant or award from the Department of Health, Education, and Welfare.

This invention relates to a compound characterized by antirachitic activity substantially greater than that exhibitied by vitamin $D_3$.

More specifically, this invention relates to a derivative of vitamin $D_2$.

The character and activity of the vitamins, $D_3$ and $D_2$, are well known and well documented. In recent years various derivatives of vitamin $D_3$ and $D_2$ have been found (see, for example, U.S. Pat. Nos. 3,565,924 and 3,585,221) which exhibit antirachitic activity greater than those D-vitamins and which exhibit other and more specific activity in inducing or promoting various functions at certain sites in the animal body.

A derivative of vitamin $D_2$ has now been found which exhibits substantially greater antirachitic activity than the universally used vitamin $D_3$. This derivative has been identified as 1,25-dihydroxyergocalciferol (1,25-dihydroxy-vitamin $D_2$).

ISOLATION

Radioactive ($3\alpha$-$^3H$) vitamin $D_2$ (1.2 Ci/mMole) was prepared by the method of Callow, Kodicek and Thompson, Proc. Roy. Soc. B. 164, 1 (1966) using sodium ($^3H$) borohydride (7.5 Ci/mMole) (supplied by New England Nuclear, Boston, Massachusetts). ($3\alpha$-$^3H$)25-hydroxyergocalciferol was isolated from rats given ($3\alpha$-$^3H$) vitamin $D_2$ and unlabeled 25-hydroxyergocalciferol was isolated from pigs given vitamin $D_2$ according to the procedure of Suda et al., Biochemistry 8, 3515 (1969). A mixture of labeled and unlabeled 25-hydroxyergocalciferols gave a ($3\alpha$-$^3H$)25-hydroxygergocalciferol of specific radioactivity 3.53 mCi/mMole. This material was dissolved in ethanol at a concentration of 500 ng per 10 $\mu l$ (as determined by ultraviolet absorption spectrophotometry assuming $\epsilon_{264}=18,200$ $M^{-1}$ $cm^{-1}$).

($3\alpha$-$^3H$)25-Hydroxyergocalciferol (3.53 mCi/mMole) was incubated with kidney mitochondria from rachitic chicks in the system used by Ghazarian and DeLuca, Arch. Biochem. Biophys. 160, 63 (1974) to study the production of 1,25-dihydroxycholecalciferol.

One hundred flasks, each containing 500 ng ($3\alpha$-$^3H$)25-hydroxyergocalciferol incubated for 30 minutes, were pooled and extracted with methanol-chloroform (ratio 2:1) by the method of Bligh and Dyer, Can. J. Biochem. Physiol. 37, 911 (1959). The total extract was dissolved in 7 ml of a 65:35 mixture of chloroform:Skellysolve B (straight run aliphatic napthas (essentially normal hexane) derived from petroleum oil marketed by Skelly Oil Company and having a boiling range of 60°–68°). The extract was divided into 7 equal parts each of which was subjected to chromatography on columns (60 cm × 1.0 cm i.d.) of 16 g of Sephadex LH-20 (Pharmacia Fine Chemicals) swelled and eluted with chloroform:Skellysolve B (ratio 65:35). Fifty five-milliliter fractions were collected from each column and 50 $\mu l$ samples from each fraction were taken for counting in a liquid scintillation counter (Nuclear Chicago Model Isocap 300). Fractions 21–32 from each of the 7 columns contained the peak of radioactivity under investigation, whereas fractions 6–11 contained unchanged ($3\alpha$-$^3H$)25-hydroxyergocalciferol. Fractions 21–32 inclusive from each of the 7 columns were pooled and evaporated to dryness under a stream of nitrogen. The resulting dry material was redissolved in 0.5 ml chloroform:Skellysolve B (ratio 30:70) and subjected to the following 4 chromatographic steps in succession to remove remaining impurities.

i. Hydroxyalkoxypropyl Sephadex* straight phase column chromatography

Eluting solvent: Chloroform:Skellysolve B 30:70 Room temp.

Column size: 52 × 2 cm containing 50 g gel 5 ml fractions: Derivative in fractions 80–115 (peak radioactivity)

*Made from Sephadex LH-20 (Pharmacia Fine Chemicals) by the method of Ellingboe, Nystrom, and Sjovall, J. Lipid. Res. 11, 266, 1976.

ii. Celite column chromatography. (Suda et al., Biochemistry 9, 2917 (1970).)

Column size: 60 × 1 containing 20 g Celite (a diatomaceous silica product marketed by Johns Manville Company).

Stationary phase: 300 ml of 90 percent methanol – 10 percent water

Mobile phase: 750 ml of 80 percent Skellysolve B –20 percent chloroform

Temperature: 23° C 5 ml fractions: Derivative in fractions 39–42 (peak radioactivity)

iii. Hydroxyalkoxypropyl Sephadex reverse phase column chromatography

Eluting solvent: Redistilled anhydrous methanol Room temp.

Column size: 51 × 1 cm containing 18 g gel 5 ml fractions: Derivative in fractions 5 and 6 (peak radioactivity)

iv. Sephadex LH-20 gel filtration column chromatography

Eluting solvent: Redistilled anhydrous methanol Room temp.

Column size: 150 × 1 cm containing 30 g gel 1.7 ml fractions: Derivative in fractions 43–49 (peak radioactivity)

IDENTIFICATION

Ultraviolet absorption spectrophotometry showed that the cis-triene structure of 25-hydroxyergocalciferol remained intact ($\lambda_{max}$=265 nm). Mass spectrometry (performed using an A.E.I. MS-9 mass spectrometer using a direct probe inlet at temperatures of 118°–130° above ambient) of the metabolite showed that the molecular ion was at m/e 428. The presence of 3 hydroxyl functions was demonstrated by the formation of a tritrimethylsilyl ether derivative of molecular weight 644. The mass fragment of m/e 131 in the case of the tritrimethylsilyl ether derivative, and the fragments m/e 370 and 352 (370-$H_2O$) in the case of the metabolite confirms that the 25-hydroxyl function of the 25-hydroxyergocalciferol remains intact during conversion to this new derivative. Small peaks at m/e 287, 269 (287-$H_2O$) and 251 (287-2$H_2O$) which arise by loss of the entire side chain (C-17-C-20 cleavage) confirm the lack of additional oxygen substituents on the side chain. The other 2 hydroxyl groups must be located in ring A, since the mass spectrum of the derivative exhibited prominent ions at m/e 152 and 134 (152-$H_2O$) which can only be interpreted as the oxygen analogs of the characteristic ions at m/e 136 and 118 (136-$H_2O$) observed in the spectra of 25- hydroxyergocalciferol and vitamin $D_2$ (Suda et al., Biochemistry 8, 3515 (1969).) The interpretations are further strengthened by the observation of fragments of m/e 296 (152+2 silyl groups) and 206 (296-HOSi(CH$_3$)$_3$) in the mass spectrum of the tritrimethyl silyl ether derivative of the derivative. The presence of the triene structure is also confirmed by the peaks m/e 152 and 134.

As this derivative was produced from the incubation of 25-hydroxyergocalciferol, it can be assumed with confidence that the C-3 hydroxyl group is still present. This is supported by the likely possibility that an inversion or loss of the 3$\beta$-hydroxyl function would have resulted in loss of the 3$\alpha$-$^3$H during production of the derivative. The foregoing results permit the extra hydroxyl function to be present only in the A ring at C-1, C-2, and C-4. Treatment of the derivative with sodium m-periodate (Suda et al., Biochemistry 9, 4776, (1970)) resulted in no loss of tritium from the molecule and no change in its chromatographic position on Sephadex LH-20 (run as described earlier under isolation). Under identical conditions an analogous compound (24,25-dihydroxycholecalciferol) with vicinal hydroxyl functions was cleaved by periodate treatment. These observations establish that the extra hydroxyl function of the A ring is not at C-2 or C-4 but at C-1. The structure of this derivative is therefore 1,25-dihydroxyergocalciferol.

BIOLOGICAL ACTIVITY

Biological activity was determined by the antirachitic line test assay as described in U.S. Pharmacopoeia 14th revision (Mack Publishing Co., Easton, Pa. (1955)) except that the 1,25-dihydroxy vitamin $D_2$ was injected at a level of 0.00625 $\mu$g per day intraperitoneally in hydroxy propyl cellulose* for 5 days.

|  | Calcification score | Activity IU/$\mu$g |
|---|---|---|
| Standard vitamin $D_3$ | 4.3 | 40 |
| 1,25-dihydroxyvitamin $D_2$ | 4.2 | 470 |

*Prepared by Ben Venue Laboratories, Bedford, Ohio.

Having thus described the invention what is claimed is:

1. 1,25-Dihydroxyergocalciferol.

* * * * *